116,047

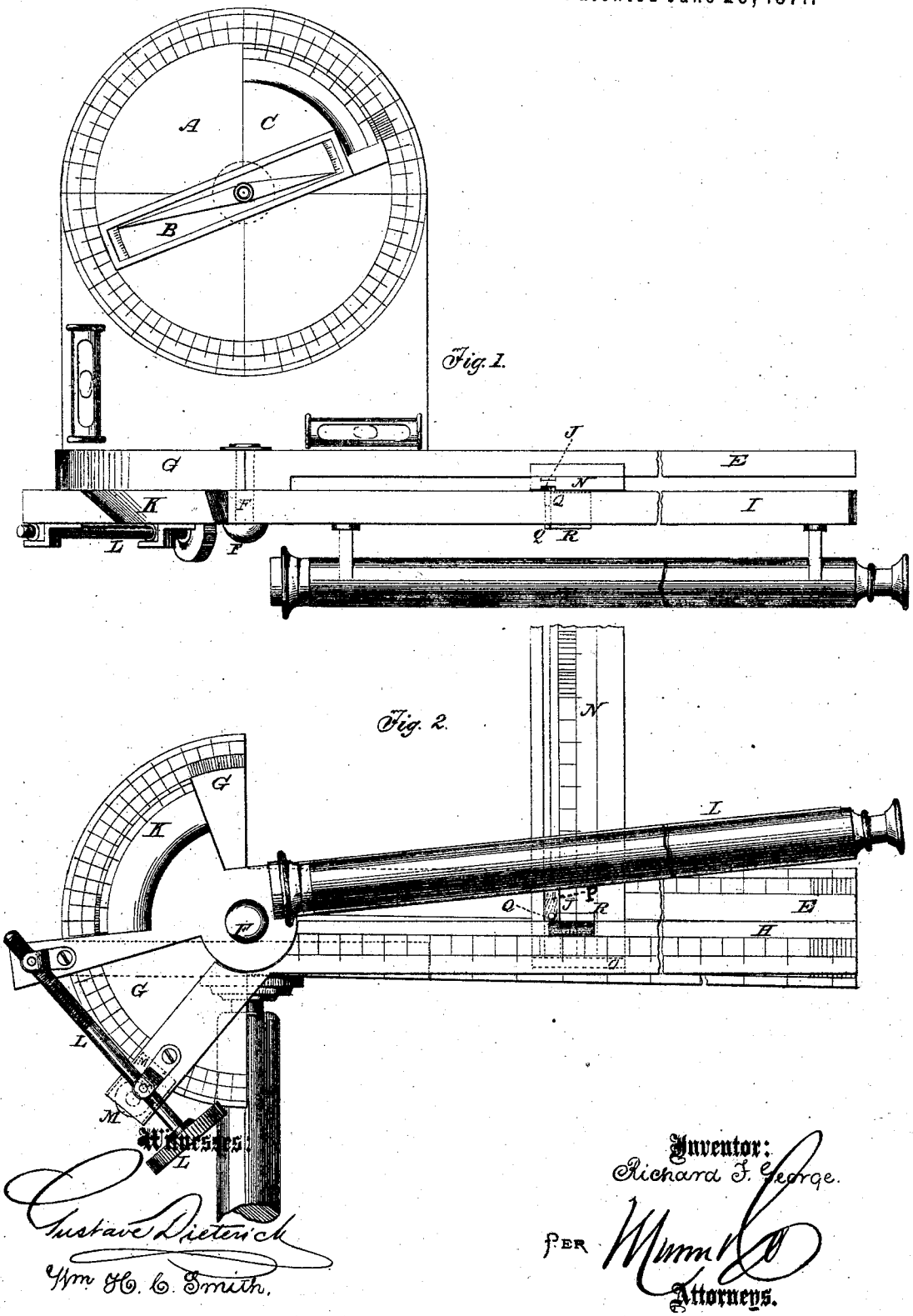

UNITED STATES PATENT OFFICE.

RICHARD F. GEORGE, OF PALMYRA, VIRGINIA.

IMPROVEMENT IN SURVEYING INSTRUMENTS.

Specification forming part of Letters Patent No. 116,047, dated June 20, 1871.

*To all whom it may concern:*

Be it known that I, RICHARD F. GEORGE, of Palmyra, in the county of Fluvanna and State of Virginia, have invented a new and improved Compass for Horizontal Surveying and Grading; and I do hereby declare that the following is a full, clear, and exact description thereof, which will enable others skilled in the art to make and use the same, reference being had to the accompanying drawing forming part of this specification.

The object of this invention is to provide an instrument for surveying which will save a great amount of calculation in the field. This instrument, titled a "compass for horizontal surveying and grading," is provided with a telescope and graduated beams with verniers attached, so as to insure the greatest possible accuracy in measuring any angle, height, depth, or distance to or from any given point, the construction and operation of which will be fully understood from the following description.

Figure 1 represents a plan view of my compass for horizontal surveying and grading. Fig. 2 is an elevation of the same.

Similar letters of reference indicate corresponding parts.

In this case the disk A is divided into quadrants, each of which is divided into ninety degrees. These degrees number, respectively, from the zero-points, which are north and south. On top of the aforesaid disk, and pivoted thereto, is an oblong compass-box, B. The said compass-box is provided with a suitable clamp to hold it in any desired position. The base of the compass-box is spread at one end so as to form a segment, C, whose periphery is divided into sixty parts, which equal fifty-nine degrees on the disk A. This vernier reads to minutes. D D are spirit-levels attached to the disk or plate A. These levels are set at right angles to each other, as shown in the accompanying drawing. The stationary arm E is divided from its center F to its outward extremity into half-inches and twentieths of an inch. Each half-inch on this arm represents one chain on the ground, and each twentieth of an inch one-tenth of a chain. On the inner or short end of the aforesaid stationary arm E there is a semicircular arc, G, which is rigidly attached to the plate A. This semicircular arc G is divided into two quadrants, whose zero is in the center, numbering from zero to ninety degrees each way. In the center of this semicircle there is a pivot on which the movable arms H and I swing. The long ends of the said arms H I and that of the stationary arm E are equal to each other in length. The movable arm H is divided into half-inches and twentieths of an inch. J is a traveling vernier between these movable arms, which is used in finding the oblique or grade distance. The short end of the arm I has a vernier, K, similar to that described in compass-box, which reads to minutes. The arm H and the telescope-arm I are pivoted on the same point and connected by a tangent-screw, L, so that, when set nearly on the object of sight and then clamped, it may, by the said tangent-screw, be moved exactly in its proper position. The aforesaid clamp M is of the ordinary kind, and is attached to the short end of the arm H. The perpendicular scale N is divided into half-inches and twentieths of an inch, and has a fixed vernier at its lower extremity, marked O. The said scale N has a slot or channel cut nearly its entire length, in which there is a traveling vernier, P, which reads to links on the upright scale N. This vernier P has a cylindrical pin, Q, (one-twentieth of an inch in diameter,) attached, which slides between the movable arms H I for the purpose of indicating how far to slide the scale to make it point to the horizontal distance on the stationary arm E. The aforesaid pin Q passes through a hole prepared for it in the vernier R, which travels on the movable arm H to show the oblique or grade distance. This instrument is also provided with a clamp from the staff to the compass-box, to prevent it from turning, thus making the instrument capable of being used for taking bearings, after the first one, independently of the needle, in localities where there is any local attraction.

To use this instrument, it is necessary to set a graduated staff or let fall a graduated plumb-line provided with two targets. The lower target is set the same height above the ground as the compass, and the upper target one-tenth of a chain above the first; then direct the telescope to the lower target and clamp it; then turn the arm H to the telescope-arm I and clamp it; then, with the tangent-screw L, raise the telescope until it sights the upper target and clamp it; then slide the perpendicular scale N along the stationary arm E, placing the pin Q on the vernier between the two movable arms, and move it toward the pivot F until it becomes moderately tight. This done, the instrument is ready for reading the horizontal distance.

The grade distance is read on the arm H and the horizontal distance on the stationary arm E, and rise or fall, as indicated by the vernier, on the upright scale N.

The scale N must always be held perpendicular to the stationary arm E.

Having thus described my invention, I claim as new and desire to secure by Letters Patent—

The combination of the two movable or angle-measuring arms and perpendicular with the fixed or level distance-arm, as and for the purpose specified.

RICHARD F. GEORGE.

Witnesses:
R. C. STRANGE,
J. W. SEAVY.